UNITED STATES PATENT OFFICE.

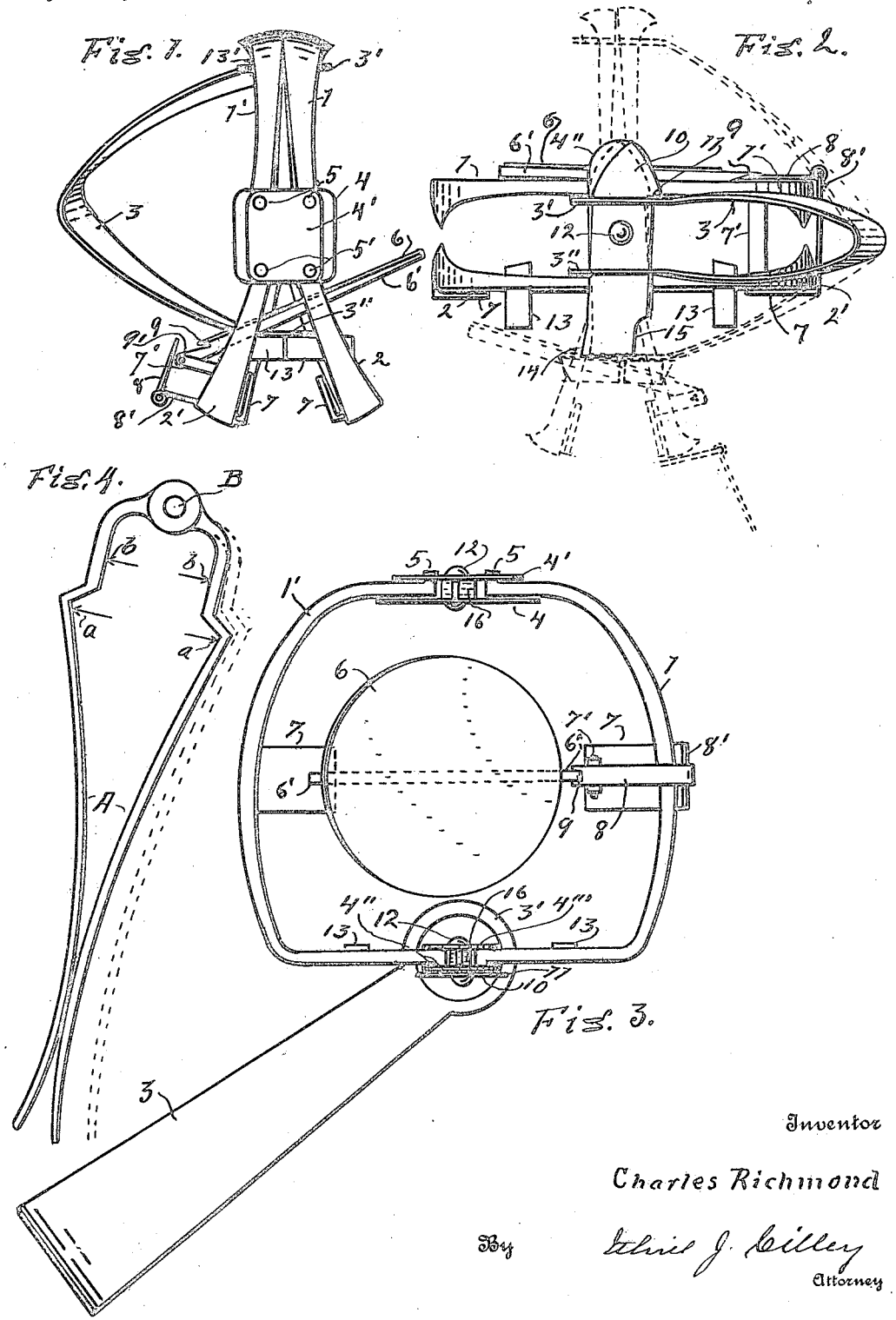

CHARLES RICHMOND, OF SMYRNA, MICHIGAN.

ANIMAL-TRAP.

1,372,906.  Specification of Letters Patent.  Patented Mar. 29, 1921.

Application filed February 7, 1920. Serial No. 357,039.

*To all whom it may concern:*

Be it known that I, CHARLES RICHMOND, a citizen of the United States, residing at Smyrna, in the county of Ionia and State of Michigan, have invented certain new and useful Improvements in Animal-Traps, of which the following is a specification:

My invention relates to improvements in animal traps, and especially in that class known as "jump traps" and its objects are: First, to provide a means whereby the trap will be made to "jump" or rise from its normal position when sprung so as to insure the catching of the animal well up upon the leg, instead of at the foot, or at the toes, only; second, to provide a means in connection with a "jump" steel spring trap whereby the upper or active jaws of the trap will be held in extended, or set position until the lower part of the trap has raised the trap sufficiently to positively insure the action of the active jaws of the trap very close to, or upon the body of the animal, and, third, to provide a means in connection with the trap whereby it will be impossible for the animal to twist or cut the leg off and escape from the trap.

I attain these objects by the mechanism and construction of parts shown in the accompanying drawing, in which Figure 1 is an elevation of a trap looking at the back end thereof. Fig. 2 is an elevation of the same set and looking at the spring end of the trap. Fig. 3 is a plan of the trap set, and Fig. 4 is a plan of an instrument intended for setting the trap.

Similar reference characters indicate similar parts throughout the several views.

The jaws 1 and 1' represent the ordinary, active jaws of a spring steel trap, and 3 represents the actuating spring by means of which the jaws are closed. Ordinarily the end 3'' of the spring rests upon the standard 4'' just below the pivot points, 5, of the jaws 1—1', and act only upon these jaws. In my construction I place a second pair of jaws, 2, 2', below the jaws 1—1' and pivotally connected with the standards as at 5'.

When the trap is "sprung" or in normal position, the end 3' will contact the projecting parts 13' of the upper jaws, and the end 3'' will rest upon the lugs 13 on the jaws 2, 2' to hold the jaws of the trap firmly in place upon the leg of the animal, when an animal has sprung the trap, substantially as shown in Fig. 1 and indicated in Fig. 2. When the trap is set, as indicated in Figs. 2 and 3, the end 3' of the spring presses upon the lower surface of the jaws 1—1' and the end 3'' presses upon the upper surfaces of the jaws 2—2', and the jaws are held in place by means of the pawl 8, mounted upon the standard 8', engaging the notch 9 in the bar 6' that carries the trip pan 6. 7, 7 are base plates mounted upon the jaws 2—2'. One of these plates supports and carries the standard 7' upon which the bar 6' is pivotally mounted, and the standard 8' upon which the pawl 8 is pivotally mounted.

To lock the jaws 1—1' in place so they cannot be closed until after the jaws 2—2' have been actuated by the spring 3 I pivotally mount a latch 10, upon the standard 4'', as at 12, and pass the projecting point 11 upon the upper surface of the end 3' of the spring, and the end 3'' of the spring will hold the latch in place until said end has passed below the offset 15, when the action of the spring upon the offset or incline 14 will force the latch over and will release the end 3' of the spring and allow the spring to pass upwardly, suddenly and forcibly closing the jaws 1—1', but not until after the jaws 2—2' have raised the trap sufficiently to properly trap the animal.

While the incline 14 is not an essential element on the latch, I find it a very desirable one as eliminating any possibility of failure to free the spring and actuate the jaws 1—1'.

In Fig. 4 I have shown an implement designed to compress the spring for setting the trap. When the spring is in the position shown in Fig. 1 the implement is placed with the arms A extended sufficiently so the points *a—a* will engage the ends of the spring, and when the spring has been compressed sufficiently so one pair of jaws may be held in place the implement is shifted so the points *b—b* may be brought to bear upon the spring and compress the ends sufficiently to properly set the trap in the position shown in Fig. 2, the two jaws, 1' and 2' being bound together by means of the standard 8', the pawl 8, and the bar 6' that carries the trip pan 6.

At 16 I have shown a connecting and supporting body between the plates 4 and 4', also between the plates 4'' and 4''', which act, also, to hold the jaws in proper vertical or normal position.

What I claim as new in the art, is:

1. In an animal trap, supporting standards, an upper pair of jaws and a lower pair of jaws pivotally mounted upon the standards, a spring mounted upon the upper jaws and upon the lower jaws in such a manner as to force the lower jaws to throw the trap upwardly before the upper jaws are closed.

2. In an animal trap, supporting standards, an upper pair of jaws, a lower pair of jaws, all pivotally mounted upon the standards, a spring mounted to act upon the upper surface of the lower jaws and upon the lower surface of the upper jaws, a latch pivotally mounted upon one of the standards and arranged to lock the upper jaws in place until the lower jaws have been sprung, and means for automatically releasing the latch from the spring when the lower jaws have been sprung.

3. In an animal trap, supporting standards, upper jaws, and lower jaws pivotally mounted upon the standards, a spring mounted to act upon the lower surface of the upper jaws, and upon the upper surface of the lower jaws, resistance lugs mounted upon the lower jaws, a latch pivotally mounted upon the standard and having a catch at the upper end in position to engage and hold the spring, and an offset at the other end of the latch in position to relieve the latch when the end of the spring has thrown the jaws sufficiently so the spring will rest upon the lugs and release the upper end of the spring and close the upper jaws.

Signed at Smyrna, Michigan, January 29 1920.

CHARLES RICHMOND.